No. 783,708. PATENTED FEB. 28, 1905.
W. STANLEY.
GENERATING LOW FREQUENCY CURRENTS.
APPLICATION FILED NOV. 11, 1903.

Witnesses
Geo. V. Rasmussen
[signature]

Inventor
WILLIAM STANLEY
By his Attorney
[signature]

No. 783,708. Patented February 28, 1905.

UNITED STATES PATENT OFFICE.

WILLIAM STANLEY, OF GREAT BARRINGTON, MASSACHUSETTS.

GENERATING LOW-FREQUENCY CURRENTS.

SPECIFICATION forming part of Letters Patent No. 783,708, dated February 28, 1905.

Application filed November 11, 1903. Serial No. 180,641.

*To all whom it may concern:*

Be it known that I, WILLIAM STANLEY, a citizen of the United States, residing at Great Barrington, county of Berkshire, State of Massachusetts, have invented certain new and useful Improvements in Generating Low-Frequency Currents, of which the following is a full, clear, and exact description.

My invention relates to means for producing alternating currents, especially such currents as are of low periodicity, and has for its object to provide an efficient means which can supply a current of considerable volume without being abnormally large or expensive.

Heretofore it has been impossible to generate currents of low periodicity without using apparatus which was unduly large and expensive in comparison with the electric energy produced. This was on account of the necessarily slow speeds employed in revolving the armature or field of the machine, so as to produce the required frequency. Thus if one wishes to produce currents of a frequency of five periods per second by the ordinary method of causing a magnetic field to traverse coils wound upon an armature the rate of relative motion of such field is necessarily as low as three hundred revolutions per minute, this being the rate required when a bipolar machine is used and two poles being the smallest number that can be employed in an alternating-current generator.

With the apparatus which I employ the frequency of the generator is independent of the speed of revolution of the armature in which the currents are induced. The apparatus may therefore be of normal size. The frequency, moreover, may be varied over wide limits without changing the speed of the induced element of the machine.

The following is a description of apparatus employed by me for embodying and carrying out my invention, reference being had to the accompanying drawings, in which—

Figure 1:
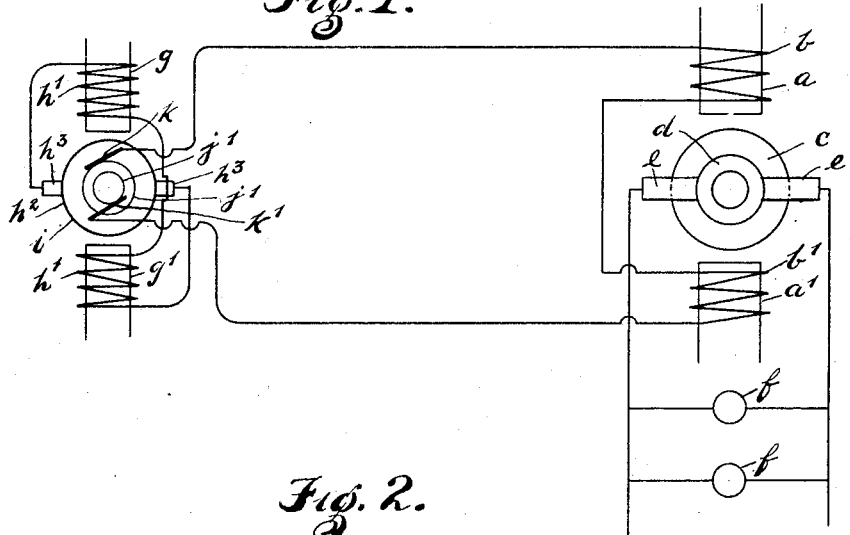
Figure 2:
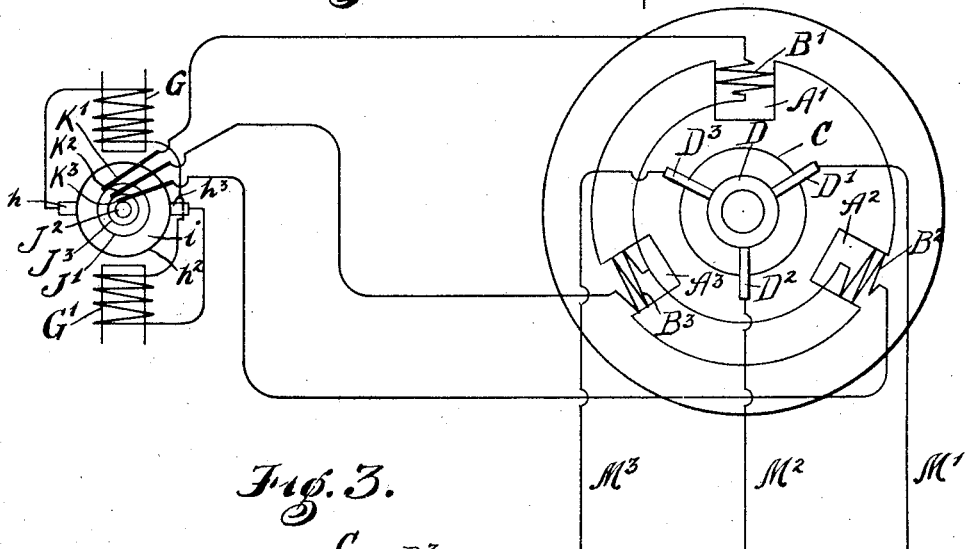
Figure 3:
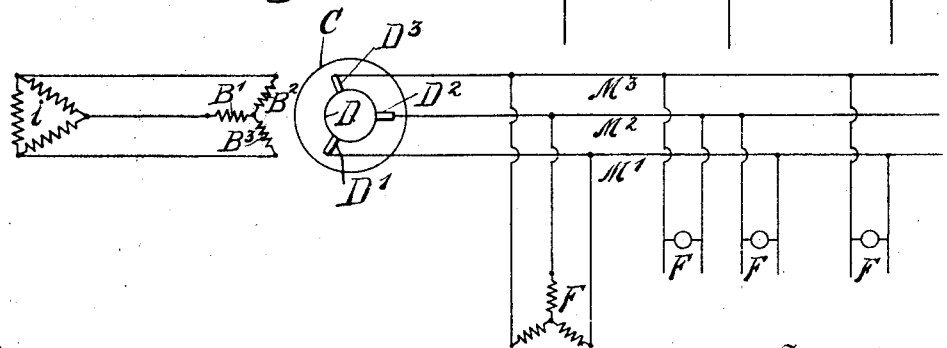

Figure 1 shows a simplified form of my apparatus. Fig. 2 shows a form for generating three-phase currents, and Fig. 3 is a diagram of circuits.

Referring more particularly to the drawings, in Fig. 1, $a\ a'$ are the field-magnet poles of a bipolar generator laminated in the manner usually found where fluctuating or alternating currents are employed. $b\ b'$ are the energizing-windings upon this field-magnet. $c$ is an armature such as ordinarily found in a continuous-current machine with a Gramme or other closed winding connected to a commutator-cylinder $d$ of the usual type and revolving within the field of the magnet-poles $a\ a$. $e\ e$ are brushes bearing upon the commutator-cylinder, from which lead conductors to the translating devices $f$. The energizing-windings $b\ b'$ are supplied by alternating currents of low frequency from a small alternating-current exciter having field-magnet poles $g\ g'$, energized by windings $h\ h'$, supplied with continuous currents from the commutator $h^2$, on which bear collecting-brushes $h^3\ h^3$, and an armature $i$, the winding on which is connected to slip-rings $j\ j'$, upon which bear brushes $k\ k'$, connected to the mains leading to the windings $b\ b'$. The exciter is run at such a speed as will give a current of the desired frequency. Inasmuch as the only work that this exciter is called upon to do is to supply a magnetizing-current to the windings $b\ b'$, it may be made small in size and yet generate the requisite current. In operating this system the exciter is operated to generate alternating currents of the desired periodicity, which are fed to the energizing-windings $b\ b'$. This produces an alternating magnetic field between the poles $a\ a'$ of the field-magnet. The armature $c$ is then caused to revolve within this alternating field at a rate such as will generate the desired electromotive forces to supply the desired volume of current. The result will be that the electromotive forces impressed upon the brushes bearing upon the commutator will rise and fall with the fluctuations of magnetism in the field-magnet and will produce an alternating current having the frequency of that of an exciter. The small energy which this exciter is called upon to furnish enables that machine to be made small in size, and the high speed at which the generator can be run enables it to be made of comparatively small size.

In Fig. 2 I have shown a means for producing three-phase alternating currents of low periodicity from a single generator. A' A² A³ are three polar projections of a field-magnet provided with energizing-windings B' B² B³. Within the field existing between the polar projections A' A² A³ revolves the armature C, having an ordinary Gramme winding and provided with a commutator D, upon which bear brushes D' D² D³. From these brushes lead three conductors M' M² M³ for supplying the current to the translating devices F. G G' are magnet-poles of a low-frequency three-phase exciter from the collecting-rings J' J² J³, of which three-phase currents of low frequency are taken by the brushes K' K² K³, which are connected to the windings B' B² B³. This exciter, since its load is always small, can be made of small size in spite of the low frequency of the current generated. The currents obtained from the brushes D' D² D³ depend upon the speed at which the armature C is driven, except so far as their frequency is concerned, which is determined by the frequency of the exciter. The generator can therefore be made of normal size for the amount of electric energy supplied in spite of the low frequency which it is to furnish. The polar projections A' A² A³ become successively positive and negative, and the brushes D' D² D³ become successively positive and then negative poles of the outgoing circuits and lead from the machine alternating multiphase currents corresponding in frequency to the frequency impressed upon the field system by the exciter. In a similar manner two-phase or other multiphase generators may be constructed which will furnish alternating currents corresponding in frequency to the frequency impressed upon the field system.

Inasmuch as the alternating fields produced by the exciter simply increase and diminish in strength, the neutral points upon the commutator are substantially fixed in position, so that the brushes being located at these points are subject to very little sparking.

In carrying out my invention for the generation of multiphase currents I may impress the low-frequency magnetizing-currents upon the field to produce an apparent rotating field, either in the same or in a direction opposite to that of the revolution of the armature, and thereby give to the generator in these two cases the peculiar characteristics of either an overdriven or underdriven machine.

What I claim is—

1. In a generator of low-frequency currents, the combination of a field structure, an armature, means for exciting the field structure with alternating currents of the desired frequency, means for revolving the armature and means for impressing upon the mains electromotive forces having the frequency of the exciting-currents independent of the speed of rotation, and producing thereby currents of the frequency of the exciting-currents.

2. In combination a generator having a field-magnet provided with energizing-windings, an armature and a commutator for collecting the currents in said armature, and a low-frequency exciter supplying low-frequency currents to the field-windings of said generator.

3. In combination a generator having a field structure provided with multiphase energizing-windings, an armature, and a commutator and brushes for collecting the currents induced in said armature, and a low-frequency exciter supplying multiphase currents to the windings of said field, the brushes of said commutator collecting multiphase currents.

4. In a generator of low-frequency currents the combination of a field structure producing a magnetic field, an armature with windings revolving in said field, and having induced therein alternating electromotive forces, a commutator connected to said armature bearing thereon and means for causing said brushes to have impressed thereon low-frequency phase-differing electromotive forces producing low-frequency phase differing currents of different frequency from said alternating electromotive forces.

5. In combination, a generator having a field structure provided with three-phase energizing-windings, an armature revolving in the fields produced thereby, a commutator for collecting currents from said armature, brushes bearing on the neutral points of said commutator and connected to the mains and a three-phase exciter supplying three-phase currents to said energizing-windings.

Signed at New York, N. Y., this 10th day of November, 1903.

WILLIAM STANLEY.

Witnesses:
H. B. BROWNELL,
L. VREELAND.